(12) United States Patent
Zushi

(10) Patent No.: US 9,118,229 B2
(45) Date of Patent: Aug. 25, 2015

(54) ELECTRIC DRIVE UNIT

(75) Inventor: Yusuke Zushi, Tokyo (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 225 days.

(21) Appl. No.: 13/812,305

(22) PCT Filed: Jul. 14, 2011

(86) PCT No.: PCT/JP2011/066160
§ 371 (c)(1),
(2), (4) Date: Jan. 25, 2013

(87) PCT Pub. No.: WO2012/014698
PCT Pub. Date: Feb. 2, 2012

(65) Prior Publication Data
US 2013/0127305 A1   May 23, 2013

(30) Foreign Application Priority Data

Jul. 26, 2010   (JP) .................................. 2010-166851

(51) Int. Cl.
| | |
|---|---|
| *H02K 5/24* | (2006.01) |
| *H02K 11/00* | (2006.01) |
| *H02K 11/02* | (2006.01) |
| *H02K 5/22* | (2006.01) |

(52) U.S. Cl.
CPC .............. *H02K 5/24* (2013.01); *H02K 11/0073* (2013.01); *H02K 11/022* (2013.01); *H02K 5/225* (2013.01)

(58) Field of Classification Search
CPC ... H02K 5/24; H02K 11/022; H02K 11/0073; H02K 5/225
USPC ............................................. 310/68 D, 89, 90
See application file for complete search history.

(56) References Cited

U.S. PATENT DOCUMENTS

| | | | |
|---|---|---|---|
| 7,775,060 B2 | 8/2010 | Nakajima et al. | |
| 2004/0163409 A1 | 8/2004 | Nakajima et al. | |
| 2008/0088187 A1* | 4/2008 | Shao et al. | 310/51 |
| 2009/0015112 A1* | 1/2009 | Binder et al. | 310/68 R |
| 2010/0172770 A1* | 7/2010 | Ichise et al. | 417/366 |

FOREIGN PATENT DOCUMENTS

| | | | | |
|---|---|---|---|---|
| JP | 10014159 | * | 1/1998 | ............... H02K 5/16 |
| JP | 2004-260898 A | | 9/2004 | |
| JP | 2008-118770 A | | 5/2008 | |
| JP | 2009-171750 A | | 7/2009 | |

* cited by examiner

*Primary Examiner* — Terrance Kenerly
(74) *Attorney, Agent, or Firm* — Foley & Lardner LLP

(57) ABSTRACT

An electric drive unit includes an inverter, a stator that receives an AC current from the inverter and forms a magnetic field, a rotor rotated by the magnetic field formed by the stator, a shaft that protrudes into both sides in an axial direction of the rotor and moves in synchronization with the rotor, an inverter casing that stores the inverter in a galvanic isolation state, and a motor housing. The motor housing stores the stator and the rotor in a galvanic isolation state, rotatably supports one end of the shaft using a first bearing, and rotatably supports the other end of the shaft using a second bearing. The inverter and the inverter casing are arranged in an inner side from a pair of bearings including the first and second bearings.

8 Claims, 16 Drawing Sheets

US 9,118,229 B2

ELECTRIC DRIVE UNIT

TECHNICAL FIELD

The present invention relates to an electric drive unit.

BACKGROUND ART

There is disclosed an electric drive unit that drives a motor using an inverter (refer to JP2004-260898A).

SUMMARY OF THE INVENTION

In the technique disclosed in JP2004-260898A, since a bearing that retains a rotor is provided between the motor and the inverter, an impedance of an electric current path passing through the shaft and the bearing is lower than an impedance of an electric current path that does not pass through the shaft and the bearing. For this reason, due to a common mode voltage generated by inverter switching, a high-frequency electric current flows to the shaft through the bearing so that electromagnetic noise is emitted externally.

The present invention provides an electric drive unit capable of suppressing emissive electromagnetic noise even in an inverter-driven motor.

An electric drive unit of an aspect of the present invention comprises an inverter, a stator that receives an AC current from the inverter and forms a magnetic field, a rotor rotated by the magnetic field formed by the stator, a shaft that protrudes into both sides in an axial direction of the rotor and moves in synchronization with the rotor, an inverter casing that stores the inverter in a galvanic isolation state, and a motor housing that stores the stator and the rotor, rotatably supports one end of the shaft using a first bearing, and rotatably supports the other end of the shaft using a second bearing. The inverter and the inverter casing are arranged in an inner side from a pair of bearings including the first and second bearings.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a schematic circuit diagram of the electric drive unit, obtained by delineating parasitic capacitances and the like;

DESCRIPTION OF THE EMBODIMENTS

Hereinafter, embodiments of the present invention will be described with reference to the accompanying drawings.

Figure 1A:
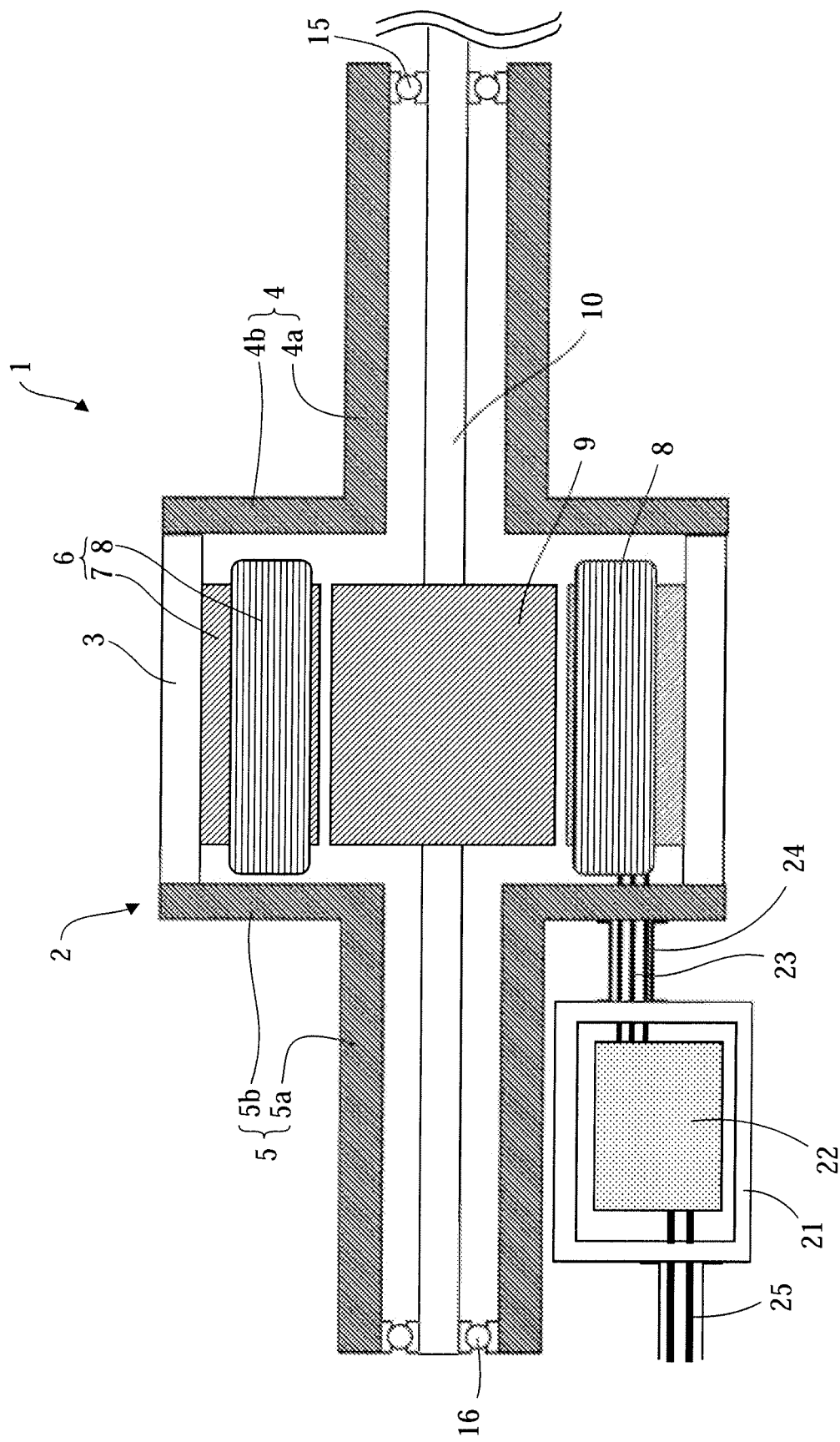
FIG. 1A is a schematic vertical cross-sectional view illustrating an electric drive unit according to the first embodiment.

FIG. 1A is a schematic vertical cross-sectional view illustrating an electric drive unit 1 according to the first embodiment of the present invention. A motor housing 2 includes a cylindrical circumferential-direction retaining member 3 and bearing retaining covers 4 and 5 provided in the left and right sides of the circumferential-direction retaining member 3. A stator core 7 having, generally, a cylindrical shape (or polygonal cylindrical shape) is fixed to an inner circumferential wall of the circumferential-direction retaining member 3.

A stator 6 includes the stator core 7 and a coil 8. The coil 8 is wound around the stator core 7.

In a space considered as a center of the stator core 7, a rotor 9 having a circular pillar shape is arranged with a predetermined gap. A shaft 10 is provided penetrating an axial center of the rotor 9 in a horizontal direction.

The first bearing retaining cover 4 positioned in the right side of the circumferential-direction retaining member 3 includes a first tubular member 4a which covers the shaft 10 and extends to a right direction and a first flange-like member 4b extending from the left end of the first tubular member 4a to an external side in a radial direction of the shaft 10. The outer circumferential end of the first flange-like member 4b is fixed to the right end of the circumferential-direction retaining member 3 of the motor housing 2. A first bearing 15 is provided in the inner circumferential wall of the right end of the first tubular member 4a. The shaft 10 is rotationally supported by the first bearing 15 and the second bearing 16 which will be described below.

A configuration of the second bearing retaining cover 5 positioned in the left side of the circumferential-direction retaining member 3 is similar to that of the first bearing retaining cover 4 positioned in the right side of the shaft 10. That is, the second bearing retaining cover 5 includes a second tubular member 5a which covers the shaft 10 and extends in the left direction and a second flange-like member 5b extending from the right end of the second tubular member 5a to an external side in a radial direction of the shaft 10. The outer circumferential end of the second flange-like member 5b is fixed to the left end of the circumferential-direction retaining member 3 of the motor housing 2. A second bearing 16 is provided in the inner circumferential wall of the left end of the second tubular member 5a.

A motor having the stator 6 and the rotor 9 configured in this way is a radial gap inner rotor type motor. However, the present invention is not limited to the radial gap inner rotor type motor. A radial gap outer rotor type motor will be described in detail below with reference to FIGS. 10A and 10B in conjunction with the fifth embodiment. Although not illustrated in the drawings, the present invention may also be applied to an axial gap type motor. Without particularly limiting to an induction type or synchronous type motor, the present invention may be applied to any motor type if it is an alternating current (AC) motor. For example, the present invention may be applied to a permanent magnet type AC synchronous motor.

A box-like inverter casing 21 is arranged closer to the stator core 7 in comparison with the second bearing 16 of the left side, which rotationally supports the shaft 10. Inside the inverter casing 21, an inverter circuit unit 22 (inverter) is stored. The inverter circuit unit 22 is electrically insulated from the inverter casing 21.

The output side of the inverter circuit unit 22 is connected to the coil 8 using an AC cable 23 passing through the inverter casing 21 and the second flange-like member 5b. The AC cable 23 between the inverter casing 21 and the second flange-like member 5b is coated with an electromagnetic shield wire 24. The inverter circuit unit 22 is supplied with a DC current through a DC cable 25 which penetrates the inverter casing 21.

A rotational position sensor or a plurality of signal lines (not illustrated) are also connected to the shaft 10 and the motor housing 2. The right end of the shaft 10 is connected to a vehicle wheel through a decelerator and the like (not illustrated) so that the vehicle wheel is driven by rotation of the shaft 10.

The inverter casing 21 and the motor housing 2 (including the circumferential-direction retaining member 3 and a pair of the bearing retaining covers 4 and 5) described above are made of aluminum alloy, iron, or the like.

Figure 3A:
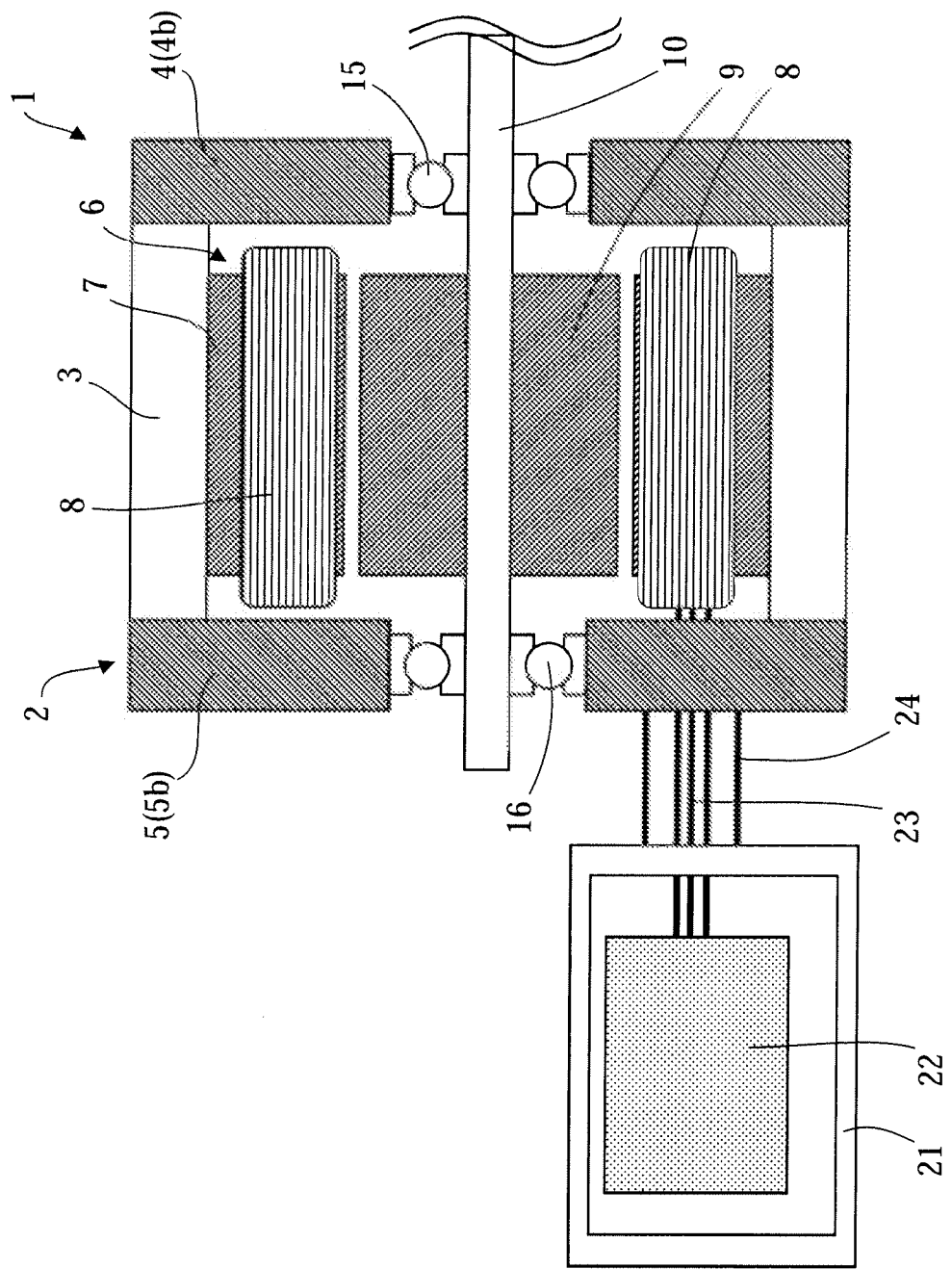
FIG. 3A is a schematic vertical cross-sectional view illustrating an electric drive unit of the related art.

FIG. 3A is a schematic vertical cross-sectional view illustrating an electric drive unit 1 of the related art, where like reference numerals denote like elements as in FIG. 1A. As recognized from comparison between FIGS. 3A and 1A, the inverter casing 21 is arranged between a pair of bearings 15 and 16 in the electric drive unit 1 according to the first embodiment, unlike the electric drive unit 1 of the related art.

The present invention may be applied to a motor inverter unit of an electric vehicle, which is arranged, for example, on a vehicle body or inside a vehicle wheel. It is highly necessary that a motor and an inverter for an electric vehicle be miniaturized in order to reliably obtain an interior space for crews. For miniaturization of the inverter, it is necessary to improve cooling. In order to improve cooling of the inverter which is insulated for electric safety purposes, it is necessary to reduce a thickness of an insulation layer having low thermal conductivity. In addition, in order to miniaturize a motor, it is necessary to improve a space factor inside the motor body. For this purpose, it is necessary to arrange stator core members and coils with high density while insulation is maintained.

By performing miniaturization as described above, an area of the insulation layer between the inverter and the inverter casing having a cooling channel and between the coil and the stator core increases, and the thickness decreases. Therefore, a parasitic capacitance increases between the inverter casing or the stator core, which is equivalent to a ground electric potential, and a strong electricity portion of the inverter circuit unit or the motor coil unit. As a result, a phenomenon occurs, in which a voltage against the ground generated by inverter switching causes a high-frequency electric current in the stator core, the rotor, the bearing, the shaft, or overall components connected to the shaft, and electromagnetic noise is externally emitted.

Figure 3B:
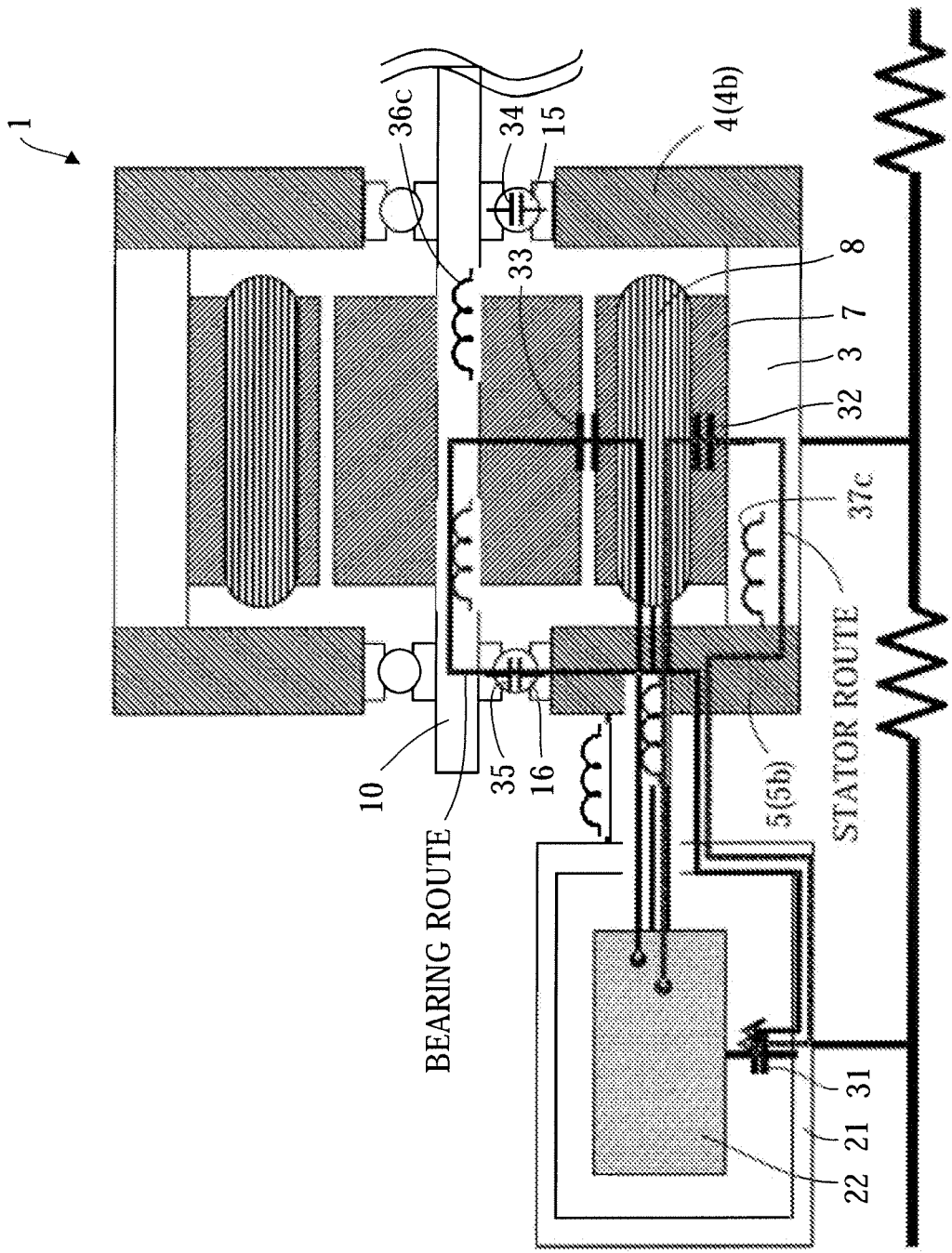
FIG. 3B is a schematic vertical cross-sectional view of the electric drive unit, obtained by delineating a pair of routes where a high-frequency electric current flows in FIG. 3A.
Figure 5:
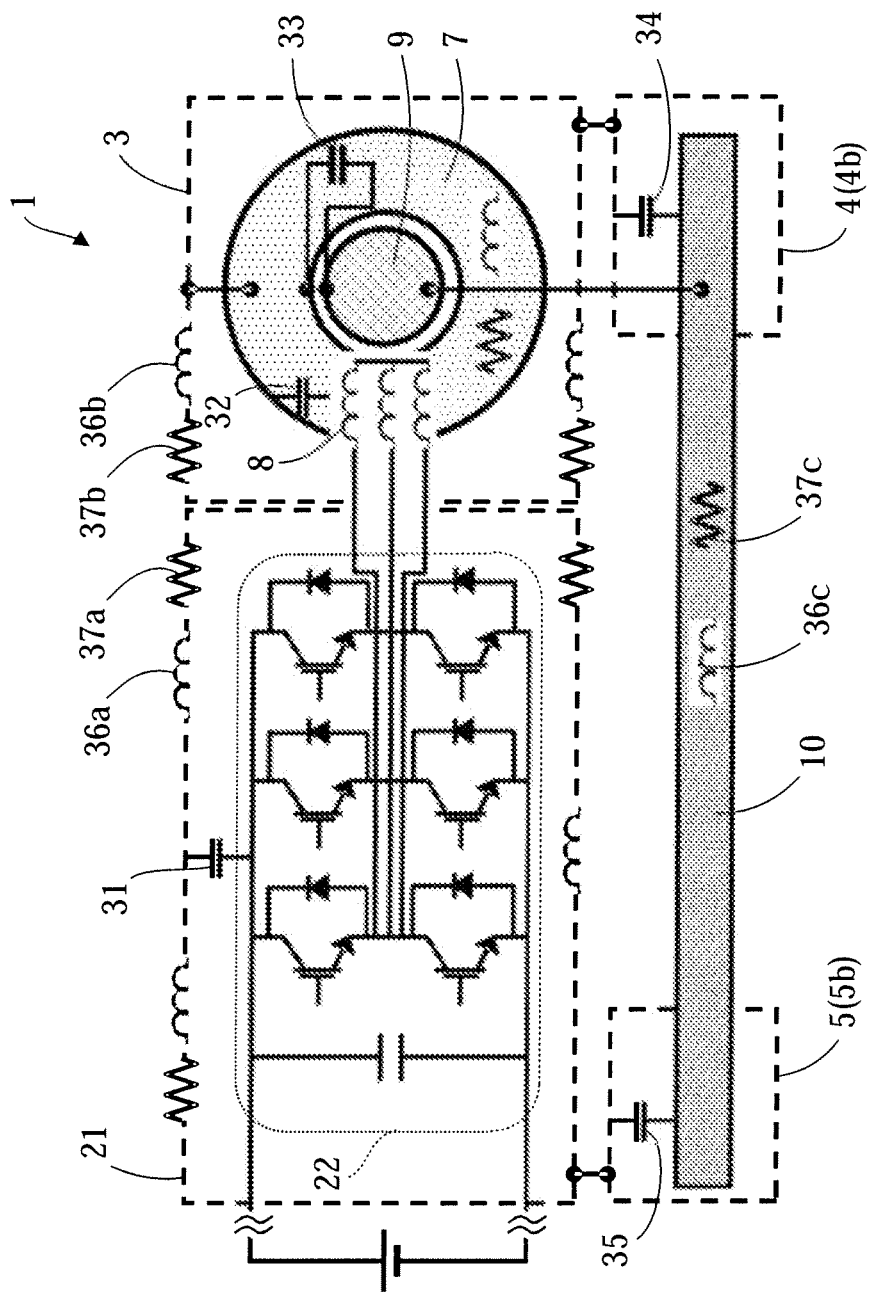

This phenomenon will be described in detail with reference to FIGS. 3B and 5. FIG. 3B is a schematic vertical cross-sectional view of the electric drive unit 1, in which resistances, inductances, and capacitances (including a parasitic capacitance) are symbolically represented in a pair of routes where a high-frequency electric current flows in. FIG. 3A. FIG. 5 is a schematic circuit diagram of the electric drive unit 1, in which resistances, inductances, capacitances (including a parasitic capacitance) are symbolically represented in the routes where a high-frequency electric current flows. While resistances are illustrated in FIG. 5, no resistance is illustrated in FIG. 3B. This is just for simplification purposes, and it does not mean that there is no resistance.

As illustrated in FIGS. 3B and 5, since the inverter circuit unit 22 is electrically insulated from the inverter casing 21, a parasitic electrostatic capacitance 31 exists between the inverter circuit unit 22 and the inverter casing 21. Similarly, a parasitic electrostatic capacitance 32 also exists between the coil 8 and the stator core 7. In addition, a parasitic electrostatic capacitance 33 also exists in an air-gap portion of the motor, and parasitic electrostatic capacitances 34 and 35 exist in an oil membrane portion generated during rotation of a pair of the bearings 15 and 16. Since the inverter casing 21, the circumferential-direction retaining member 3 of the motor housing 2 and a pair of bearing retaining covers 4 and 5 of the left and right sides (a pair of flange-like members 4b and 5b) are made of metal, they are conductive. For this reason, as illustrated in FIG. 5, inductances 36a and 36b and resistances 37a and 37b exist corresponding to characteristics of materials and shapes thereof. The shaft 10 also has an inductance 36c and a resistance 37c.

For example, in a pulse width modulation (PWM) type inverter, a common mode voltage having a high frequency component corresponding to switching thereof is applied between a motor neutral point and ground (refer to FIG. 3B), and a high-frequency electric current flows through each electrostatic capacitance 31, 32, 33, 34, and 35 and each inductance 36a, 36b, or 36c. In FIG. 3B, a pair of electric current paths (also referred to as "route") where a high-frequency electric current flows are representatively illustrated.

In one of the routes, an electric current flows from the inverter circuit unit 22 to the coil 8, and then, from the coil 8 to the downward direction so as to pass through the electrostatic capacitance 32, the circumferential-direction retaining member 3, the second bearing retaining cover 5 (second flange-like member 5b), and the electrostatic capacitance 31 (that is, without passing through the shaft 10 and the second bearing 16) and return to the inverter circuit unit 22. This route of the high-frequency electric current is referred to as a "stator route."

In the other route, the electric current flows from the inverter circuit unit 22 to the coil 8, and then, from the coil 8 to the upward direction so as to pass through the electrostatic capacitance 33, the shaft 10, the second bearing 16 (electrostatic capacitance 35), the second bearing retaining cover 5 (second flange-like member 5b), and the electrostatic capacitance 31 and return to the inverter circuit unit 22. This route of the high-frequency electric current is referred to as a "bearing route."

Figure 4:
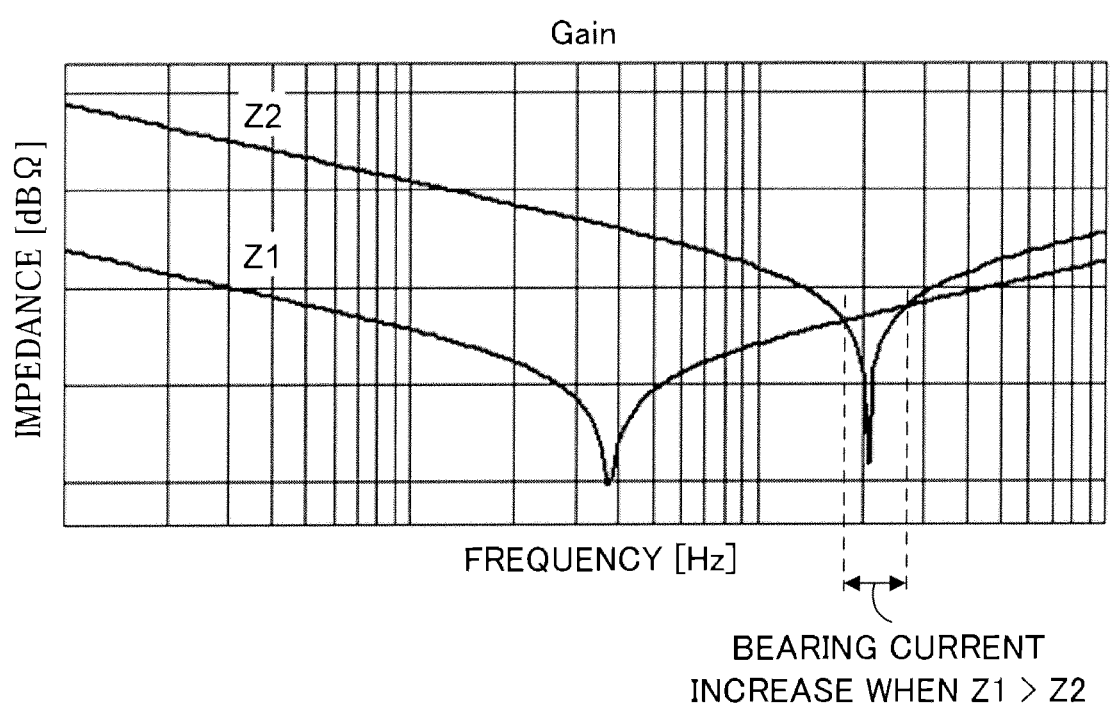
FIG. 4 is a frequency characteristic diagram for impedances of a pair of routes of the related art.

FIG. 4 illustrates frequency characteristic curves for impedances of a pair of routes (including the stator route and the bearing route), each of which represents easiness of the high-frequency electric current flow. In FIG. 4, the upper curve indicates a frequency characteristic of the impedance Z1 of the stator route of FIG. 3B, and the lower curve indicates a frequency characteristic of the impedance Z2 of the bearing route of FIG. 3B. As illustrated in FIGS. 3A and 3B, in a structure in which the second bearing 16 is arranged between the inverter casing 21 and the second bearing retaining cover 5 (second flange-like member 5b), a relationship Z1>Z2 is established for some frequency range as illustrated in FIG. 4. The common mode voltage generated by the PWM type inverter contains a wideband frequency component. Therefore, in a frequency band satisfying the relationship Z1>Z2, more high-frequency electric current flows through the shaft 10, and the electric potential of the shaft 10 is vibrated, so that more electromagnetic noise is externally emitted.

According to the present invention, for the high-frequency electric current inevitably flowing through a ground system due to miniaturization of the motor and the inverter, the high-frequency electric current is guided to a path (route) from which external emission of the electromagnetic noise is difficult, in consideration of a structure of the electric drive unit including the motor and the inverter. As a result, external electromagnetic noise emission is alleviated.

Next, a basic concept of the present invention will be described. If a route (circuit) where the high-frequency electric current flows is approximated to an R-L-C series circuit, the impedance Z of the R-L-C series circuit can be expressed as:

$$Z=\{(R^2+(\omega L-1/\omega C)^2\}^{(1/2)},$$

where "^" denotes power computation. Therefore, in order to establish a relationship Z1'<Z2' between the impedance Z1' of the stator route and the impedance Z2' of the bearing route, it is preferable that at least one of the following methods (a) and (b) be executed.

(a) increase the resistance R and inductance L of the bearing route to be higher than those of the stator route.

(b) decrease the electrostatic capacitance C of the bearing route to be lower than that of the stator route.

As a method (a) described above, the following methods (a1) and (a2) may be perceivable.

(a1) increase the resistance R and inductance L of the bearing route to be higher than those of the electric drive unit of the related art while the resistance R and inductance L of the stator route are maintained as those of the electric drive unit of the related art.

(a2) decrease the resistance R and inductance L of the stator route to be lower than those of the electric drive unit of the related art and increase the resistance R and inductance L of the bearing route to be higher than those of the electric drive unit of the related art.

In practice, since the method (b) described above is not realistic, the method (a1) or (a2) described above is employed.

Here, if the route where the high-frequency electric current flows is longer than that of the electric drive unit of the related art, the resistance R and inductance L increase to be higher than those of the electric drive unit of the related art. Therefore, in the method (a1) described above, that is, in order to increase the resistance R and inductance L of the bearing route to be higher than those of the electric drive unit of the related art while the resistance R and inductance L of the stator route are maintained as those of the electric drive unit of the related art, it is preferable that the length of the bearing route be longer than the length of the bearing route of the electric drive unit of the related art while the length of the stator route is maintained as that of the electric drive unit of the related art.

Meanwhile, in the method (a2) described above, that is, in order to decrease the resistance R and inductance L of the stator route to be lower than those of the electric drive unit of the related art and increase the resistance R and inductance L of the bearing route to be higher than those of the electric drive unit of the related art, it is preferable that the length of the stator route be shorter than that of the stator route of the electric drive unit of the related art, and the length of the bearing route be longer than that of the bearing route of the electric drive unit of the related art.

Figure 1B:
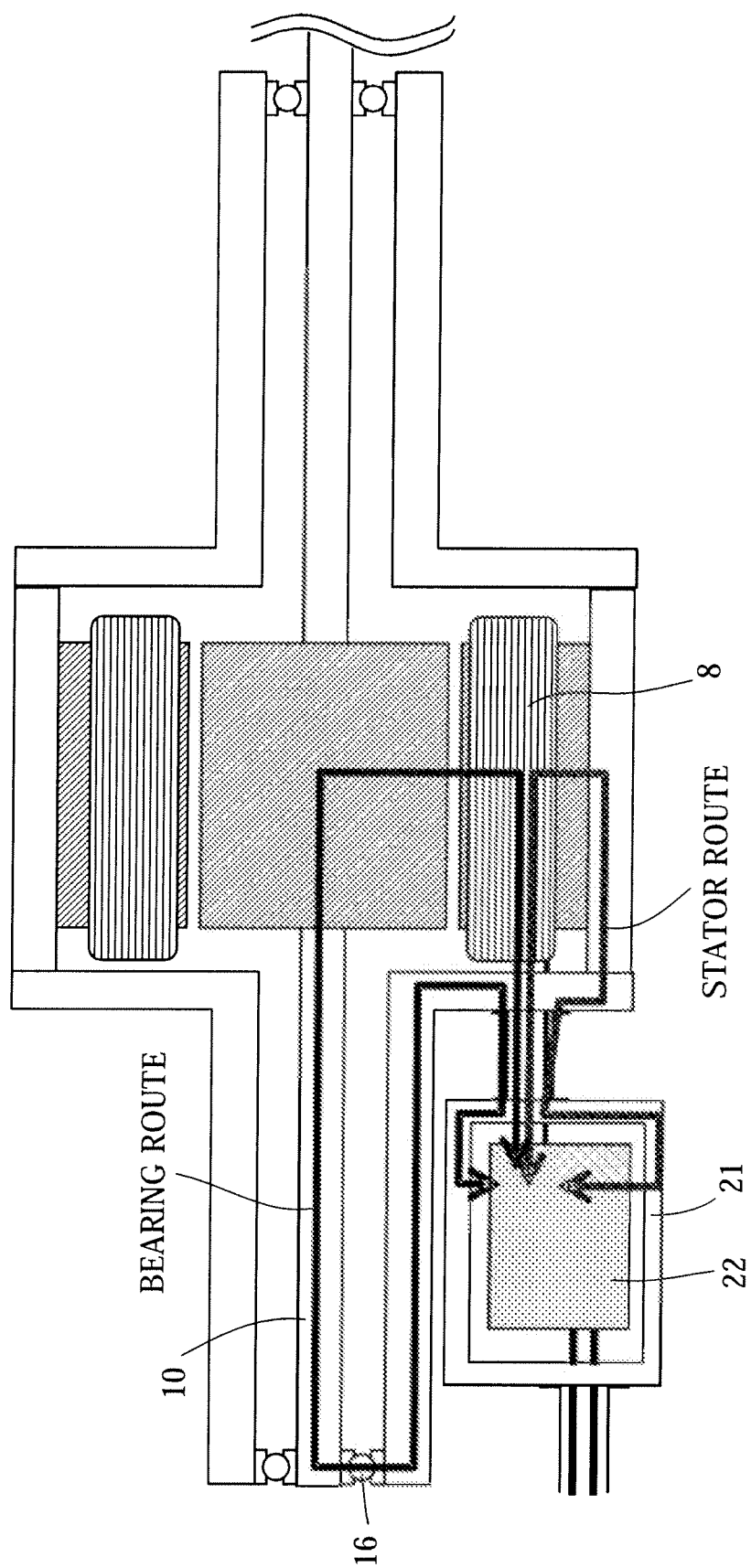
FIG. 1B is a schematic vertical cross-sectional view of the electric drive unit, obtained by delineating a pair of routes where a high-frequency electric current flows in FIG. 1A.

Hereinafter, description will be made in more detail. In the electric drive unit 1 according to the first embodiment of FIG. 1A, in the case of the method (a1) described above, that is, the resistance R and inductance L of the bearing route increase to be higher than those of the electric drive unit 1 of the related art while the resistance R and inductance L of the stator route are maintained as those of the electric drive unit 1 of the related art. FIG. 1B is obtained by delineating the stator route and the bearing route in FIG. 1A. As recognized from comparison with FIG. 3B obtained by delineating the stator route and the bearing route in the electric drive unit 1 of the related art, the electric drive unit 1 according to the first embodiment is additionally provided with tubular members 4a and 5a in a pair of the bearing retaining covers 4 and 5, so that the length of the bearing route is longer than that of the electric drive unit 1 of the related art. Meanwhile, the length of the stator route of the electric drive unit 1 according to the first embodiment is equal to that of the stator route of the electric drive unit 1 of the related art. If the length of the bearing route of the electric drive unit according to the first embodiment is longer than that of the bearing route of the electric drive unit 1 of the related art, the resistance R and inductance L of the bearing route accordingly increase to be higher than those of the electric drive unit 1 of the related art.

Figure 2:
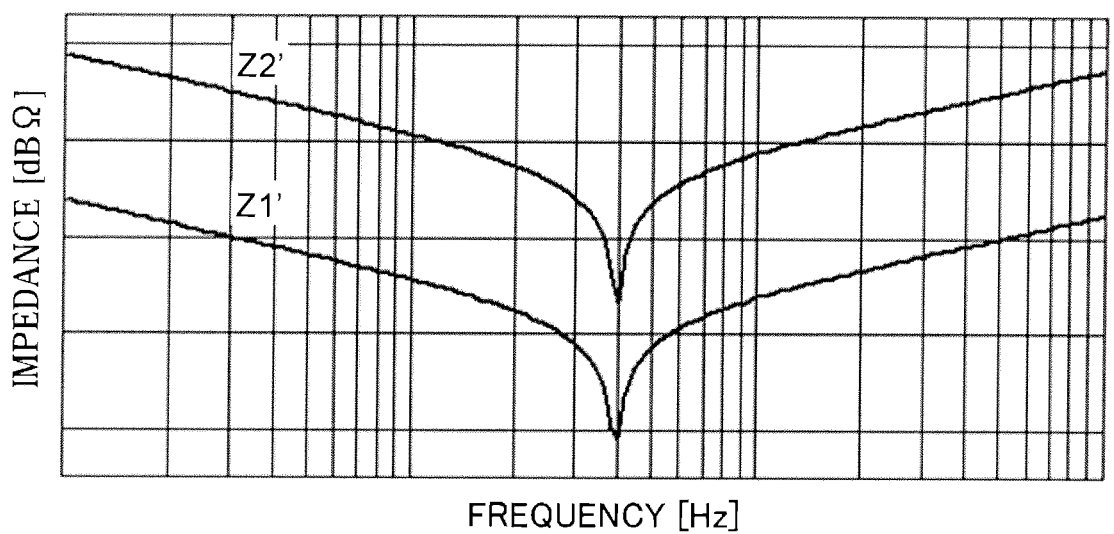
FIG. 2 is a frequency characteristic diagram for impedances of a pair of routes according to the first embodiment.

FIG. 2 overlappingly illustrates a frequency characteristic curve for the impedance Z1' of the stator route and a frequency characteristic curve for the impedance Z2' of the bearing route in the electric drive unit 1 according to the first embodiment. Unlike FIG. 4 which illustrates a frequency characteristic of the electric drive unit 1 of the related art, in the electric drive unit 1 according to the first embodiment, a relationship Z1'<Z2' is established across overall frequency bands regarding the impedance Z1' of the stator route and the impedance Z2' of the bearing route. In addition, the minimum frequencies for the impedances Z1' and Z2' are very close to each other. If the relationship Z1'<Z2' is satisfied, the high-frequency electric current flowing through the shaft 10 or the second bearing 16 decreases. Therefore, it is possible to suppress an electric potential variation in the shaft 10 and alleviate external electromagnetic noise emission.

If a high-frequency electric current flows through oil (oil film) existing in the second bearing 16, the oil is degraded so that a lifespan of the second bearing 16 is shortened. However, according to the first embodiment, the high-frequency electric current flowing through the second bearing 16 is reduced in comparison with the electric drive unit 1 of the related art. Therefore, a lifespan of the second bearing 16 can be lengthened accordingly.

In this manner, the electric drive unit according to the present embodiment includes the inverter circuit unit 22 (inverter), the stator 6 that receives an AC current from the inverter circuit unit 22 to form a magnetic field, the rotor 9 rotated by the magnetic field formed by the stator 6, the shaft 10 that protrudes in both sides of an axial direction of the rotor 9 and moves in synchronization with the rotor 9, the inverter casing 21 that stores the inverter 22 in a galvanic isolation state, and the motor housing 2. The motor housing 2 stores the stator 6 and the rotor 9 in a galvanic isolation state, rotatably supports one end of the shaft 10 using the first bearing 15, and rotatably supports the other end of the shaft 10 using the second bearing 16. The inverter circuit unit 22 and the inverter casing 21 are arranged in an inner side from a pair of the bearings 15 and 16. In this configuration, the bearing route corresponding to an electric current path passing through the shaft 10 and the second bearing 16 (the bearing close to the inverter casing 21) is longer than the bearing route of the electric drive unit 1 of the related art. That is, the impedance Z2' of the bearing route corresponding to an electric current path passing through the shaft 10 and the second bearing 16 is higher than the impedance Z1' of the stator route corresponding to an electric current path that does not pass through the shaft 10 and the second bearing 16. As a result, the high-frequency electric current component flowing through the shaft 10 is reduced, and it is possible to suppress emissive electromagnetic noise.

FIGS. 6A, 8A, 9A, and 10A are schematic vertical cross-sectional views illustrating the electric drive unit 1 according to the second, third, fourth, and fifth embodiments, respectively, where like reference numerals denote like elements as in FIG. 3A of the first embodiment. According to the second to fifth embodiments, in the case of the method (a2) described above, that is, the resistance R and inductance L of the stator route are lower than those of the stator route of the electric drive unit 1 of the related art, and the resistance R and inductance L of the bearing route are higher than those of the bearing route of the electric drive unit 1 of the related art. Hereinafter, description will be made individually for each embodiment.

In the second to fifth embodiments, the tubular members 4a and 5a are not provided unlike the first embodiment. That is, according to the second to fifth embodiments, the first bearing retaining cover 4 is similar to the first flange-like member 4b, and the second retaining cover 5 is similar to the second flange-like member 5b. Therefore, in the following description, they will be referred to as the first and second flange-like members 4b and 5b.

Figure 6A:
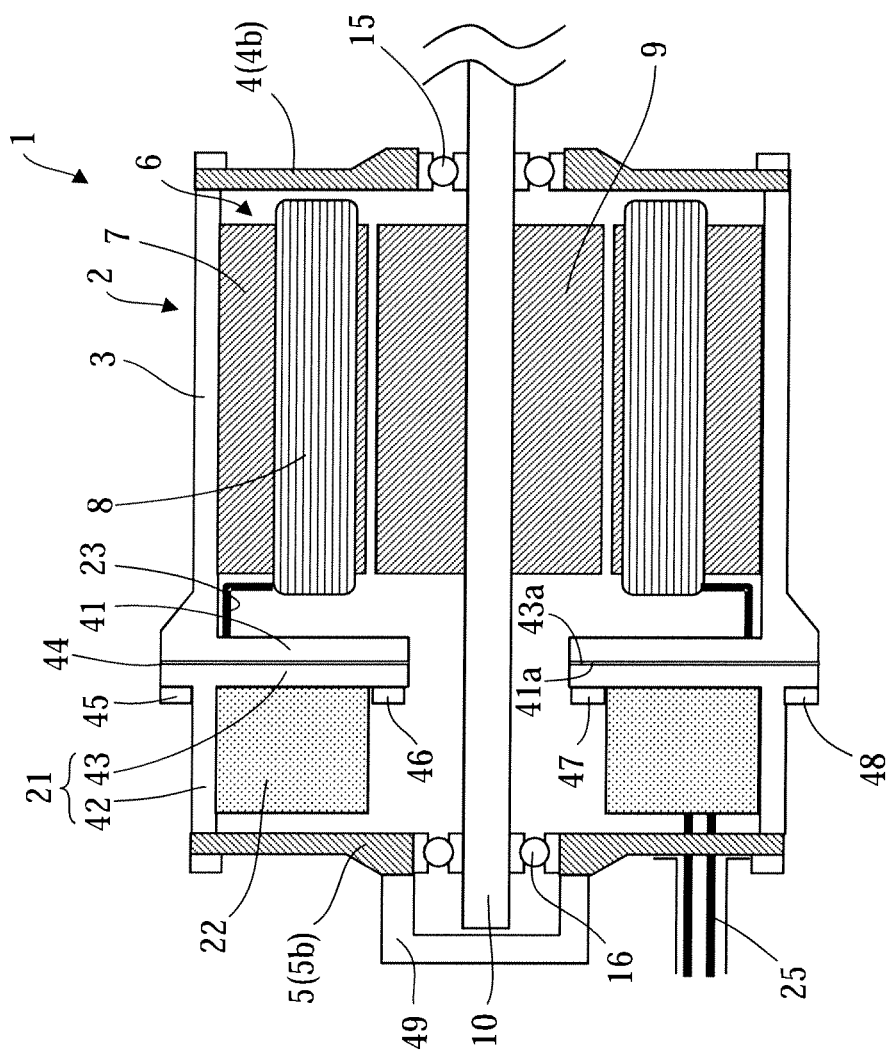
FIG. 6A is a schematic vertical cross-sectional view illustrating an electric drive unit according to the second embodiment.

In the electric drive unit 1 according to the second embodiment illustrated in FIG. 6A, based upon the premise of the electric drive unit 1 of the related art illustrated in FIG. 3A, the second flange-like member 5b of the left side is disposed aside in an axial direction of the shaft 10 (to the left side) to provide a space, and the inverter casing 21 and the inverter circuit unit 22 are contained in this space. That is, a flange 41 extending inwardly in a radial direction of the shaft 10 from the left end of the circumferential-direction retaining member 3 of the motor housing 2 is provided. Meanwhile, the inverter casing 21 includes a cylindrical circumferential-direction retaining member 42 having the same diameter as that of the circumferential-direction retaining member 3 of the motor housing 2. The circumferential-direction retaining member 42 of the inverter casing 21 is arranged in the left side of the circumferential-direction retaining member 3 of the motor housing 2.

A flange 43 extending inwardly in a radial direction of the shaft 10 from the right end of the circumferential-direction retaining member 42 of the inverter casing 21 is provided. A pair of facing flanges 41 and 43 has the same length to the inner end in a radial direction of the shaft 10. In addition, the facing surfaces 41a and 43a of a pair of the flanges 41 and 43 abut on each other by interposing a conductive member 44, and a pair of flanges 41 and 43 are pressedly fixed using a plurality of bolts 45, 46, 47, and 48.

In the inner circumferential wall of the circumferential-direction retaining member 42 of the inverter casing 21, the inverter circuit unit 22 formed in a ring shape in whole is fixed with galvanic isolation. In the left end of the circumferential-direction retaining member 42 of the inverter casing 21, the second flange-like member 5b of the motor housing 2 is fixed.

The output side of the inverter circuit unit 22 is connected to the coil 8 through an AC cable 23 penetrating a pair of flanges 41 and 43. Meanwhile, an electric current is supplied to the inverter circuit unit 22 through a DC cable 25 penetrating the second flange-like member 5b.

Similar to the first embodiment, a rotational position sensor and a plurality of signal lines (not illustrated) are also connected to the shaft 10 and the motor housing 2. A metal cap 49 that covers the left end of the shaft 10 is provided in the second flange-like member 5b of the left side. The rotational position sensor may be installed in an inner wall of the cap 49. The right end of the shaft 10 is connected to a vehicle wheel through a decelerator (not illustrated), so that the vehicle wheel is driven by rotation of the shaft 10.

Figure 6B:
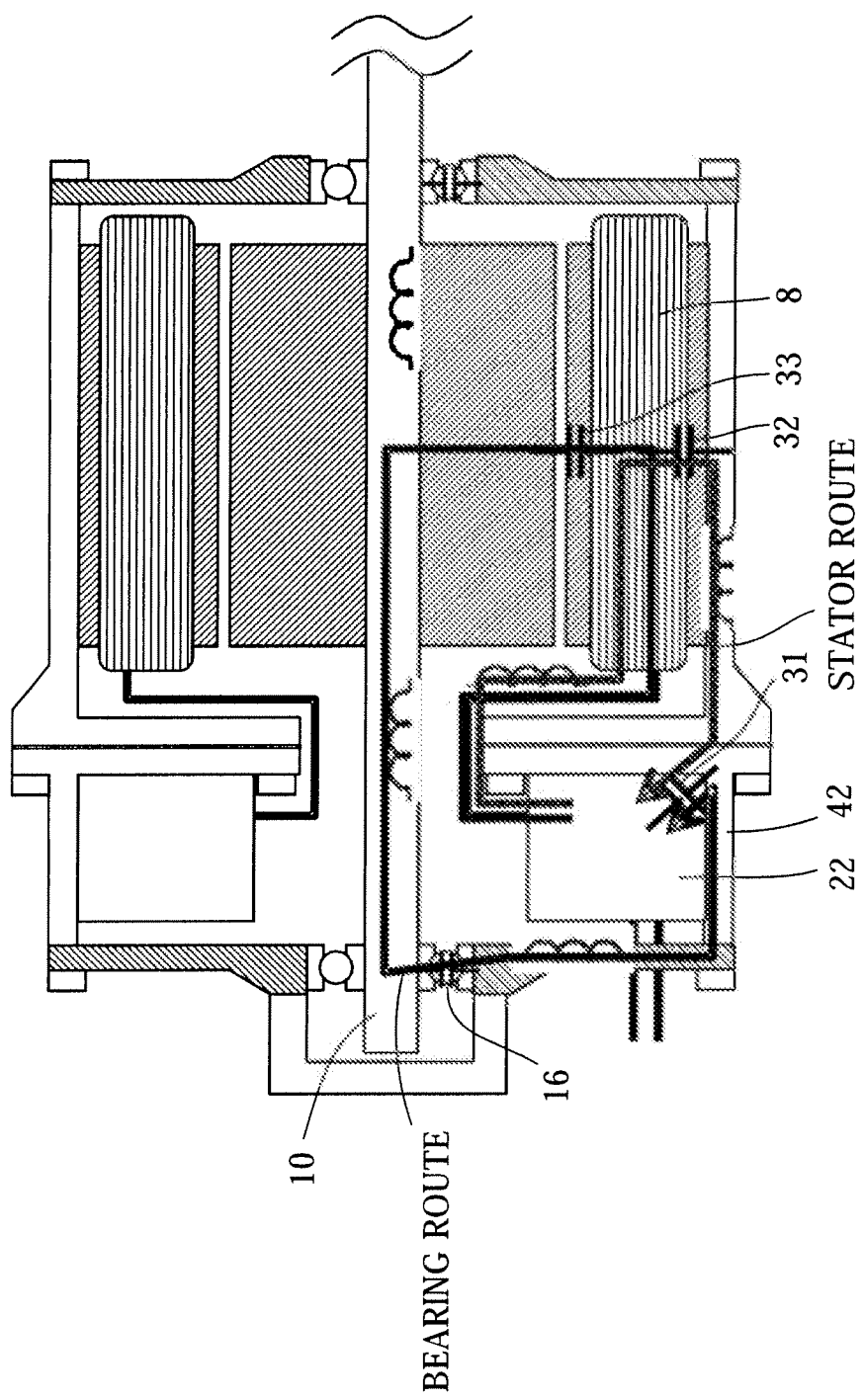
FIG. 6B is a schematic vertical cross-sectional view of the electric drive unit, obtained by delineating a pair of routes in FIG. 6A.

FIG. 6B is a schematic vertical cross-sectional view of the electric drive unit 1, obtained by delineating a pair of routes (including the stator route and the bearing route) in FIG. 6A. Comparing the electric drive unit of FIG. 3B, in which the stator route and the bearing route are delineated, with the electric drive unit 1 of the related art, it is possible to recognize the following fact from the electric drive unit 1 according to the second embodiment. Specifically, the second flange-like member 5b of the left side is disposed aside in an axial direction of the shaft 10 (to the left) to provide a space, and the inverter casing 21 and the inverter circuit unit 22 are contained in this space, so that the length of the bearing route is longer than that of the bearing route of the electric drive unit 1 of the related art.

In addition, the circumferential-direction retaining member 42 of the inverter casing 21 is additionally provided in the left side of the circumferential-direction retaining member 3 of the motor housing 2, and the abutting surfaces 41a and 43a between the flange 43 provided in the circumferential-direction retaining member 42 of the inverter casing 21 and the flange 41 provided in the circumferential-direction retaining member 3 of the motor housing 2 are widened. Furthermore, the flange 43 provided in the circumferential-direction retaining member 42 of the inverter casing 21 and the flange 41 provided in the circumferential-direction retaining member 3 of the motor housing 2 are fixed by interposing the conductive member 44. In this configuration, the resistance R and inductance L between the circumferential-direction retaining member 3 of the motor housing 2 and the circumferential-direction retaining member 42 of the inverter casing 21 are lower than those of the electric drive unit 1 of the related art. That is, the resistance R and inductance L of the stator route are lower than those of the electric drive unit 1 of the related art.

Figure 7:
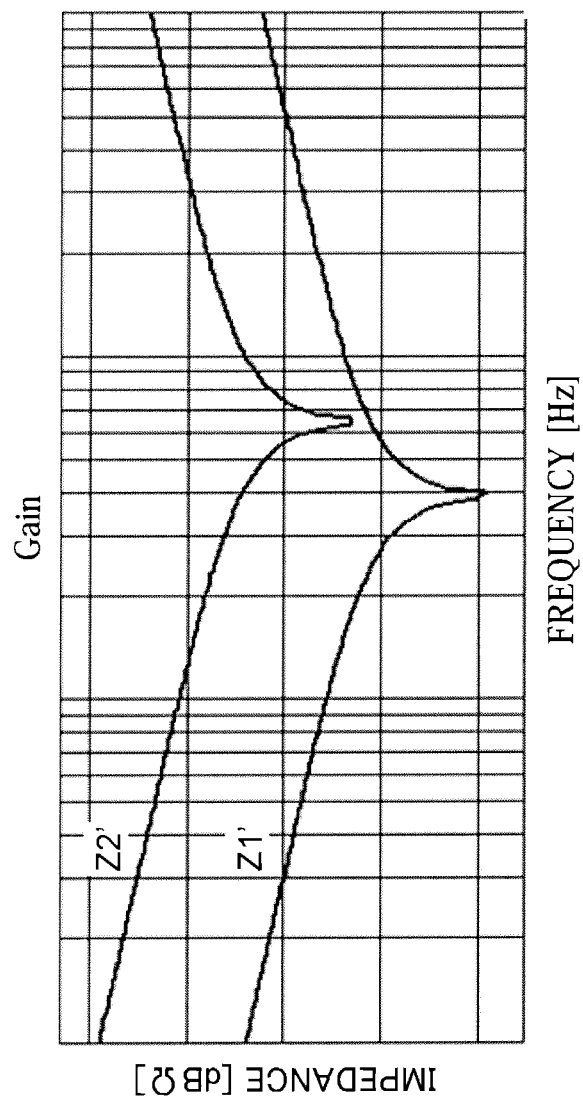
FIG. 7 is a frequency characteristic diagram for impedances of a pair of routes according to the second embodiment.

FIG. 7 overlappingly illustrates a frequency characteristic curve of the impedance Z1' of the stator route and a frequency characteristic curve of the impedance Z2' of the bearing route in the electric drive unit 1 according to the second embodiment. Unlike FIG. 4 which illustrates a frequency characteristic curve of the electric drive unit 1 of the related art, also in the electric drive unit 1 according to the second embodiment, a relationship Z1'<Z2' is established across overall frequency bands regarding the impedance Z 1' of the stator route and the impedance Z2' of the bearing route. If the relationship Z1'<Z2' is satisfied, the high-frequency electric current flowing through the shaft 10 or the second bearing 16 (the bearing close to the inverter casing 21) is reduced. As a result, it is possible to suppress an electric potential variation in the shaft 10, alleviate external electromagnetic noise emission, and increase a lifespan of the second bearing 16.

In this manner, according to the second embodiment, the motor housing 2 and the inverter casing 21 are fixed by interposing the conductive member 44. According to the second embodiment, by interposing the conductive member 44, the circumferential-direction retaining member 3 of the motor housing 2 and the inverter casing 21 are connected with a low impedance. Therefore, the impedance Z2' of the bearing route corresponding to an electric current path passing through the shaft 10 and the second bearing 16 (the bearing close to the inverter casing 21) increases in comparison with the impedance of the bearing route obtained by connecting the circumferential-direction retaining member 3 of the motor housing 2 and the inverter casing 21 without interposing the conductive member 44. As a result, the impedance Z1' of the stator route corresponding to an electric current path that does not pass through the shaft 10 and the second bearing 16 is lower than the impedance Z2' of the bearing route across overall frequency bands. Therefore, it is possible to reduce the high-frequency electric current component flowing through the shaft 10 and alleviate emissive electromagnetic noise.

According to the second embodiment, the inverter casing 21 and the circumferential-direction retaining member 3 of the motor housing 2 abut on each other at at least one of the surfaces 41a and 43a. According to the second embodiment, the impedance Z2' of the bearing route corresponding to an electric current path passing through the shaft 10 and the second bearing 16 increases in comparison with a case where the inverter casing 21 and the circumferential-direction retaining member 3 of the motor housing 2 do not abut on each other at at least one of the surfaces. In addition, the impedance Z1' of the stator route corresponding to an electric current path that does not pass through the shaft 10 and the second bearing 16 is lower than the impedance Z2' of the bearing route across overall frequency bands. As a result, the high-frequency electric current component flowing through the shaft 10 is reduced, and accordingly, it is possible to alleviate emissive electromagnetic noise.

Figure 8A:
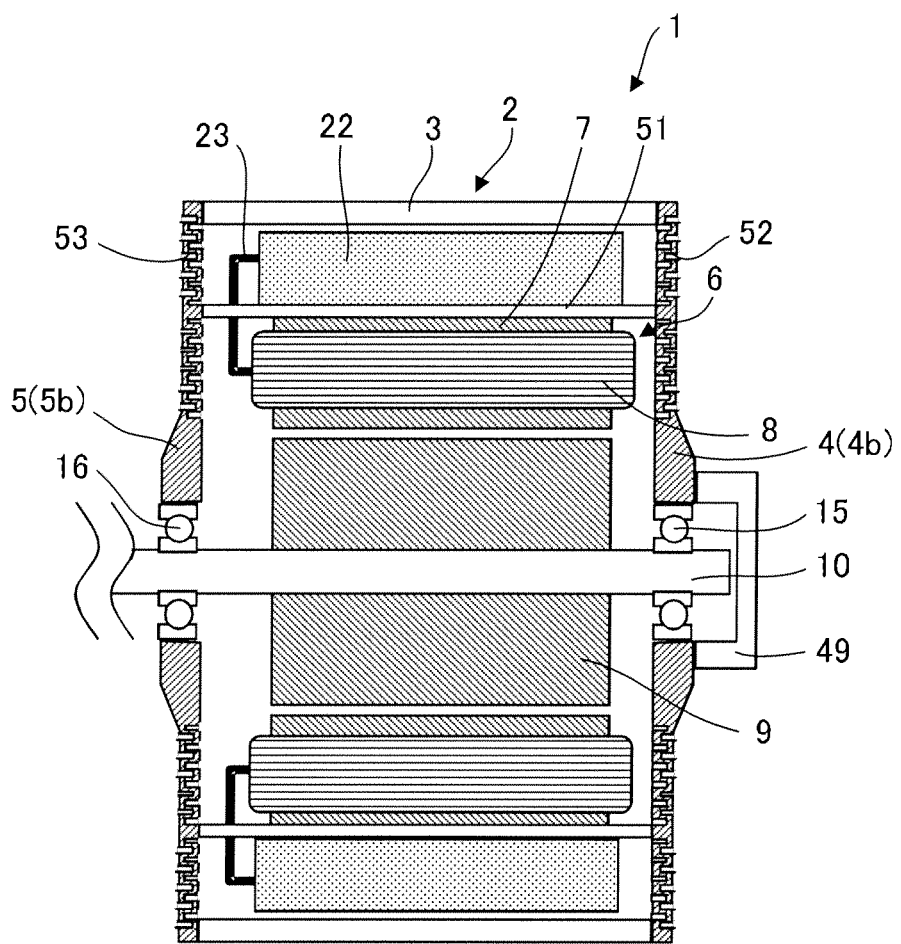
FIG. 8A is a schematic vertical cross-sectional view illustrating an electric drive unit according to the third embodiment.

In the electric drive unit 1 according to the third embodiment illustrated in FIG. 8A, the circumferential-direction retaining member 3 (or polygonal cylindrical member) of the motor housing 2 is disposed aside to the outer side in a radial direction of the shaft 10 to provide a circular cylindrical space, and the inverter casing 21 and the inverter circuit unit 22 are contained in this circular cylindrical space, based upon the premise of the electric drive unit 1 of the related art illustrated in FIG. 3A. In the electric drive unit 1 according to the second embodiment, the motors 6 and 9 and the inverter 22 are arranged in parallel along an axial direction of the shaft 10. In comparison, in the electric drive unit 1 according to the third embodiment, the motors 6 and 9 and the inverter 22 are overlappingly arranged in a radial direction of the shaft 10. That is, the inverter casing 21 includes a cylindrical circumferential-direction retaining member 51 having a diameter smaller than that of the circumferential-direction retaining member 3 of the motor housing 2. In addition, the circumferential-direction retaining member 51 of the inverter casing 21 is arranged in a position where the circumferential-direction retaining member 3 of the motor housing 2 is provided in the electric drive unit 1 of the related art.

The right end of the circumferential-direction retaining member 51 of the inverter casing 21 is fixed to the first flange-like member 4b of the right side. In addition, the left end of the circumferential-direction retaining member 51 of the inverter casing 21 is fixed to the second flange-like member 5b of the left side.

In an outer circumferential wall of the circumferential-direction retaining member 51 of the inverter casing 21, the inverter circuit unit 22 formed in a ring shape in whole is fixed. In an inner circumferential wall of the circumferential-direction retaining member 51 of the inverter casing 21, a stator core 7 is fixed with galvanic isolation. That is, in the electric drive unit 1 according to the third embodiment, the circumferential-direction retaining member 51 of the inverter casing 21 also has a functionality of retaining the stator core 7. Meanwhile, the circumferential-direction retaining member 3 of the motor housing 2 positioned in the outermost circumference also serves as a part of the inverter casing. A fact that the circumferential-direction retaining member 3 of the motor housing 2 serves as a part of the inverter casing means that the abutting area between the inverter casing and the circumferential-direction retaining member 3 of the motor housing 2 is widened.

In a case where the electric drive unit 1 is manufactured in practice, a shrinkage fitting and the like are used. In this case, the inverter circuit unit 22 positioned in an inner circumferential wall side of the circumferential-direction retaining member 3 of the motor housing 2, the circumferential-direction retaining member 51 of the inverter casing 21, and the stator 6 are installed tight in an inner side of the shaft 10 in a radial direction using the circumferential-direction retaining member 3 of the motor housing 2. Therefore, a pressure is applied to the stator 6 and the circumferential-direction retaining member 51 of the inverter casing 21 (that is, in a pressed state). In a case where metal members abut on each other (make contact with each other), a resistance or inductance of the abutting portion (contact portion) changes due to a pressure applied to the abutting surface (contact surface). The resistance and inductance of the abutting portion (contact portion) decrease in proportion to the applied pressure.

According to the third embodiment, a plurality of trenches 52 and 53 are provided in a pair of flange-like members 4b and 5b of the left and right sides. By providing a plurality of trenches 52 and 53, resistances R and inductances L of a pair of flange-like members 4b and 5b of the left and right sides increase in comparison with a case where the trenches 52 and 53 are not provided. As a result, particularly, the impedance of the second flange-like member 5b of the left side increases.

According to the third embodiment, the electric drive unit 1 is substantially bilaterally symmetrical. FIG. 8A illustrates a case where the right end of the shaft 10 is covered with a cap 49, and the left end of the shaft 10 is connected to a vehicle wheel through a decelerator (not illustrated).

Figure 8B:
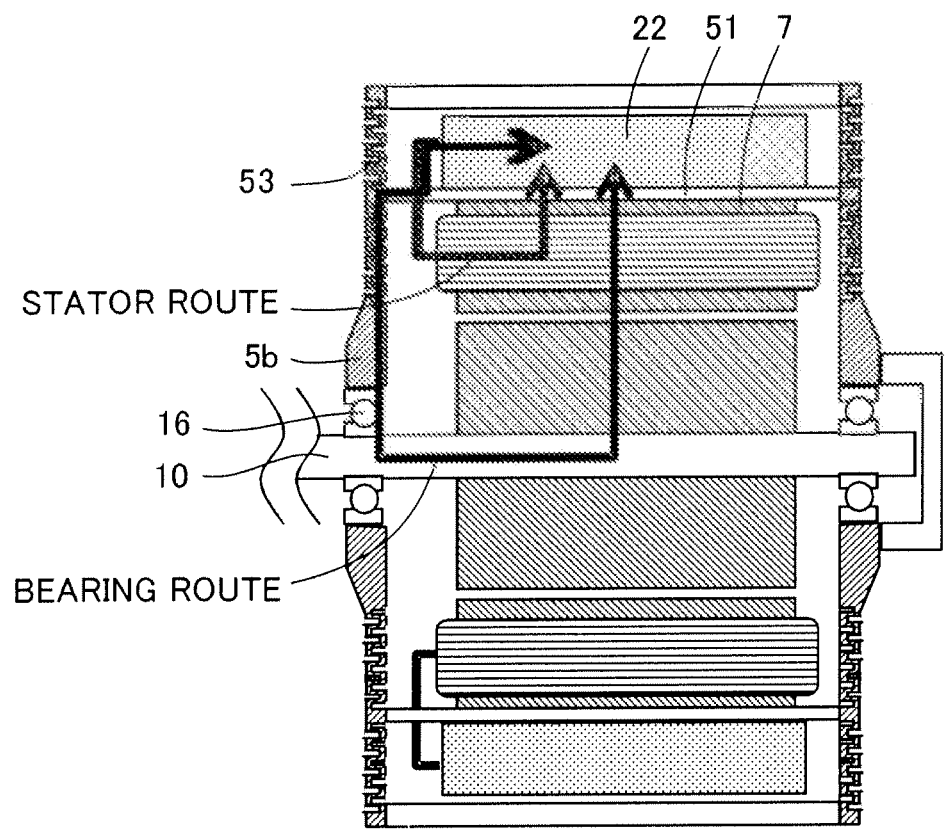
FIG. 8B is a schematic vertical cross-sectional view of the electric drive unit, obtained by delineating a pair of routes in FIG. 8A.

FIG. 8B is a schematic vertical cross-sectional view of the electric drive unit 1, obtained by delineating a pair of routes (including the stator route and the bearing route) in FIG. 8A. Comparing the electric drive unit 1 according to the third embodiment and the electric drive unit 1 of the related art with reference to FIG. 3B, in which the stator route and the bearing route are delineated, it is possible to recognize the following fact. Specifically, the length of the stator route is shorter than the length of the stator route of the electric drive unit 1 of the related art, and the resistance R and inductance L of the stator route are lower than those of the stator route of the electric drive unit 1 of the related art. In addition, the resistance R and inductance L of the bearing route are higher than those of the bearing route of the electric drive unit 1 of the related art.

In the electric drive unit 1 according to the third embodiment, the frequency characteristic curve for the impedance Z1' of the stator route and the frequency characteristic curve for the impedance Z2' of the bearing route are similar to those of FIGS. 2 and 7. That is, a relationship Z1'<Z2' is established between the impedance Z1' of the stator route and the impedance Z2' of the bearing route across overall frequency bands. As a result, it is possible to alleviate external electromagnetic noise emission and increase a lifespan of the second bearing 16.

In this manner, according to the third embodiment, the motor housing 2 includes the first and second flange-like members 4b and 5b and a cylindrical circumferential-direction retaining member 3 that stores the stator 6 and the rotor 9 outer circumferences of which are in a galvanic isolation state. The first flange-like member 4b has the first bearing 15 in an inner circumference side and extends to an outer side in a radial direction of the shaft 10. The second flange-like member 5b has the second bearing 16 in an inner circumference side and extends to an outer side in a radial direction of the shaft 10. A cylindrical circumferential-direction retaining member 51 having a diameter smaller than that of the circumferential-direction retaining member 3 is arranged as a circumferential-direction retaining member 51 of the inverter casing 21 in an inner circumference side of the circumferential-direction retaining member 3 of the motor housing 2. Both ends of the circumferential-direction retaining member 51 of the inverter casing 21 in an axial direction of the shaft are fixed to the first and second flange-like members 4b and 5b, and the inverter circuit unit 22 (inverter) is stored in a space between the circumferential-direction retaining member 51 of the inverter casing 21 and the circumferential-direction retaining member 3 of the motor housing 2.

According to the third embodiment, an abutting area (contact area) between the circumferential-direction retaining member 3 of the motor housing 2 and the inverter casing 21 is widened. In addition, due to the pressure caused by use of the shrinkage fitting and the like, the circumferential-direction retaining member 3 of the motor housing 2 and the inverter casing 21 are connected with a lower resistance and a lower inductance in comparison with a case where the circumferential-direction retaining member 3 of the motor housing 2 and the inverter casing 21 are not in a pressed state. The impedance Z1' of the stator route corresponding to an electric current path that does not pass through the shaft 10 and the second bearing 16 (the bearing close to the inverter casing 21) is lower than the impedance Z2' of the bearing route corresponding to an electric current path passing through the shaft 10 and the second bearing 16 across overall frequency bands. As a result, the high-frequency electric current component flowing through the shaft 10 is reduced, and accordingly, it is possible to alleviate emissive electromagnetic noise.

According to the third embodiment, a pair of flange-like members 4b and 5b have a plurality of trenches 52 and 53. According to the third embodiment, resistances and inductances of a pair of flange-like members 4b and 5b increase in comparison with a case where a pair of the flange-like members 4b and 5b do not have a plurality of trenches 52 and 53. As a result, the impedance Z1' of the stator route corresponding to an electric current path that does not pass through the shaft 10 and the second bearing 16 is lower than the impedance Z2' of the bearing route corresponding to an electric current path passing through the shaft 10 and the second bearing 16 across overall frequency bands. Therefore, a high-frequency electric current component flowing through the shaft 10 is reduced, and emissive electromagnetic noise is alleviated.

Figure 9A:
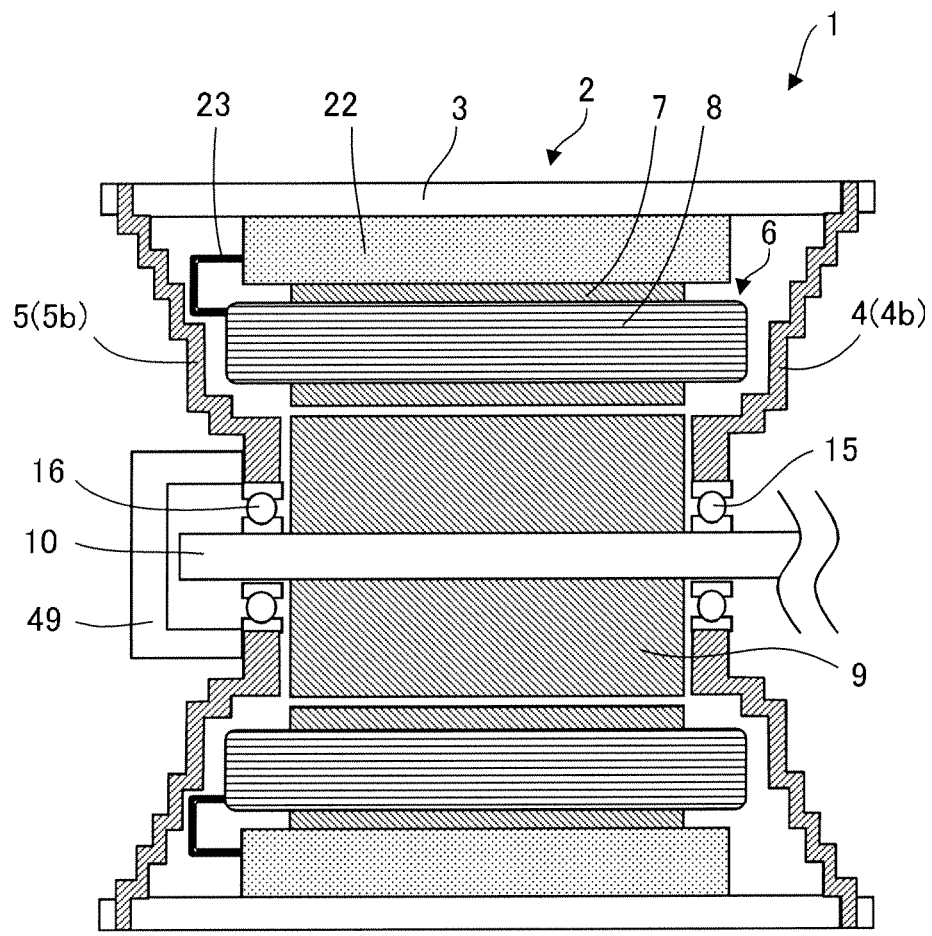
FIG. 9A is a schematic vertical cross-sectional view illustrating an electric drive unit according to the fourth embodiment.

In the electric drive unit 1 according to the fourth embodiment illustrated in FIG. 9A, the circumferential-direction retaining member 3 (or polygonal cylindrical member) of the motor housing 2 is disposed aside to the outer side in a radial direction of the shaft 10 to provide a circular cylindrical space, and the inverter casing 21 and the inverter circuit unit 22 are contained in this circular cylindrical space, based upon the premise of the electric drive unit 1 of the related art illustrated in FIG. 3A. This configuration is similar to that of the electric drive unit 1 of the third embodiment.

However, unlike the electric drive unit 1 of the third embodiment, the circumferential-direction retaining member 51 of the inverter casing 21 is not arranged in an inner circumferential side of the circumferential-direction retaining member 3 of the motor housing 2, and the circumferential-direction retaining member 3 of the motor housing 2 also serves as the circumferential-direction retaining member 51 of the inverter casing 21. Specifically, the inverter circuit unit 22 formed in a ring shape in whole is fixed to an inner circumferential wall of the circumferential-direction retaining member 3 of the motor housing 2 with galvanic isolation, and the stator core 7 is fixed to an inner circumferential wall of the inverter circuit unit 22 with galvanic isolation.

In the electric drive unit 1 according to the fourth embodiment, axial cross-sections of a pair of flange-like members 4b and 5b of the left and right sides have a step-like shape. Since the axial cross-sections of a pair of flange-like members 4b and 5b have a step-like shape, resistances R and inductances L of a pair of flange-like members 4b and 5b increase in comparison with a case where the flange-like members 4b and 5b do not have a step-like shape.

Figure 9B:
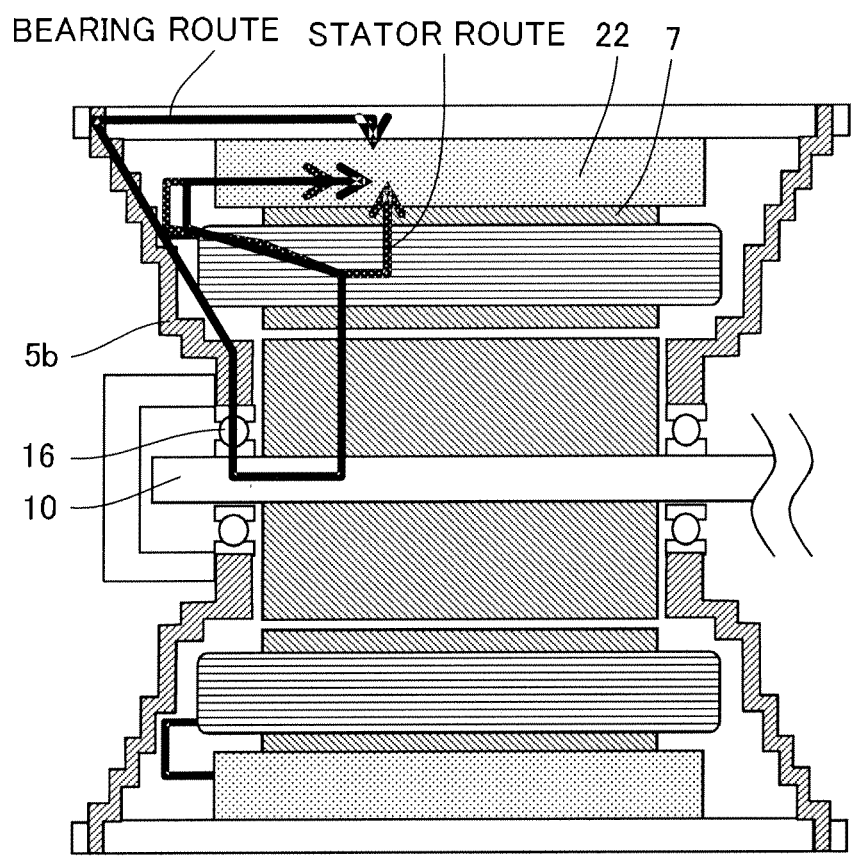
FIG. 9B is a schematic vertical cross-sectional view of the electric drive unit, obtained by delineating a pair of routes in FIG. 9A.

FIG. 9B is a schematic vertical cross-sectional view of the electric drive unit 1, obtained by delineating a pair of routes including the stator route and the bearing route in FIG. 9A. In the electric drive unit 1 according to the fourth embodiment, the inverter circuit unit 22 and the stator core 7 are directly connected. Therefore, the length of the stator route is shorter than the length of the stator route of the electric drive unit 1 of the third embodiment. As a result, the impedance Z1' of the stator route is lower than the impedance of the stator route of the electric drive unit 1 of the third embodiment. In addition, a pair of the flange-like members 4b and 5b have impedances higher than those of the flange-like members 4b and 5b of the electric drive unit 1 of the related art. Therefore, the impedance Z2' of the bearing route is higher than the impedance Z2 of the bearing route of the electric drive unit 1 of the related art.

Also in the electric drive unit 1 according to the fourth embodiment, a frequency characteristic curve for the impedance Z1' of the stator route and a frequency characteristic curve for the impedance Z2' of the bearing route are similar to those of FIGS. 2 and 7. That is, a relationship Z1'<Z2' is established between the impedance Z1' of the stator route and the impedance Z2' of the bearing route across overall frequency bands. As a result, it is possible to alleviate external electromagnetic noise emission and increase a lifespan of the second bearing 16.

In this manner, according to the fourth embodiment, the motor housing 2 includes the first and second flange-like members 4b and 5b and the circumferential-direction retaining member 3 that stores the stator 6 and the rotor 9 the outer circumferences of which are in a galvanic isolation state. The first flange-like member 4b has the first bearing 15 in an inner circumference side and extends to an outer side in a radial direction of the shaft 10. The second flange-like member 5b has the second bearing 16 in an inner circumference side and extends to an outer side in a radial direction of the shaft 10. The inverter circuit unit 22 (inverter) formed in, generally, a ring shape is fixed to the inner circumferential wall of the circumferential-direction retaining member 3 of the motor housing 2, and the stator 6 is fixed to the inner circumferential wall of the inverter circuit unit 22 formed in a ring shape. According to the fourth embodiment, since circumferential-direction retaining member 3 of the motor housing 2 and the inverter casing 21 are the same member, it is possible to reduce the number of components. In addition, since the resistance and inductance between the circumferential-direction retaining member 3 of the motor housing 2 and the inverter casing 21 are removed, the impedance Z1' of the stator route corresponding to an electric current path that does not pass through the shaft 10 and the second bearing 16 is lower than the impedance Z2' of the bearing route corresponding to an electric current path passing through the shaft 10 and the second bearing 16 across overall frequency bands. As a result, the high-frequency electric current component flowing through the shaft 10 is reduced, and accordingly, it is possible to alleviate emissive electromagnetic noise.

According to the fourth embodiment, axial cross-sections of a pair of the flange-like members 4b and 5b have a step-like shape. According to the fourth embodiment, the resistances and inductances of a pair of the flange-like members 4b and 5b increase in comparison with a case where the axial cross-sections of a pair of the flange-like members 4b and 5b do not have a step-like shape. Therefore, the impedance Z1' of the stator route corresponding to an electric current path that does not pass through the shaft 10 and the second bearing 16 is lower than the impedance Z2' of the bearing route corresponding to an electric current path passing through the shaft 10 and the second bearing 16 across overall frequency bands. As a result, the high-frequency electric current flowing through the shaft 10 is reduced, and emissive electromagnetic noise is alleviated.

Figure 10A:
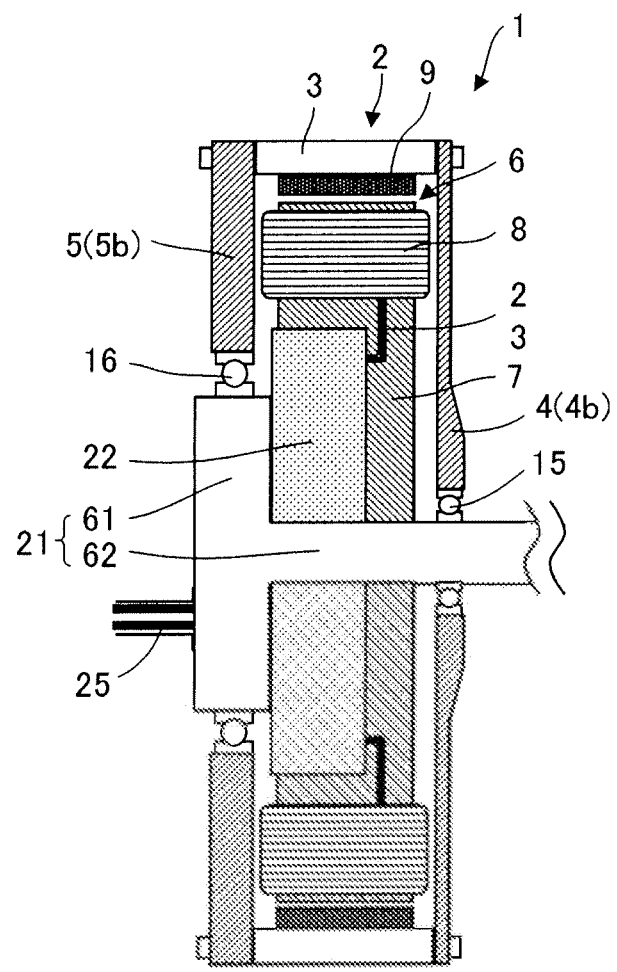
FIG. 10A is a schematic vertical cross-sectional view illustrating an electric drive unit according to the fifth embodiment.

Unlike the electric drive units 1 of the first to fourth embodiments, the electric drive unit 1 according to the fifth embodiment illustrated in FIG. 10A is suitable for a radial gap outer rotor type motor.

In the electric drive unit 1 of the fifth embodiment, the inverter casing 21 has a functionality of retaining the stator and a functionality of retaining an outer rotor, and a pair of the flange-like members 4b and 5b of the left and right sides are retained using a pair of bearings 15 and 16. Specifically, the inverter casing 21 serves as a support member including a disk-like member 61 and a concentric member 62 provided in an axial center position of the disk-like member 61. The stator 6 is fixed to the outer circumferential wall of the concentric member 62, and the rotor 9 is fixed to the inner circumferential wall of the circumferential-direction retaining member 3 of the motor housing 2.

The circumferential-direction retaining member 3 of the motor housing 2 has a circular cylindrical shape. The first flange-like member 4b is fixed to the right end of the circumferential-direction retaining member 3, and the second flange-like member 5b is fixed to the left end of the circumferential-direction retaining member 3. The first flange-like member 4b is rotationally supported by the concentric member 62 (support member) of the inverter casing 21 using the first bearing 15. The second flange-like member 5b is rotationally supported by the disk-like member 61 (support member) of the inverter casing 21 using the second bearing 16.

Inside the stator core 7, the inverter circuit unit 22 formed in, generally, a ring shape is arranged with insulation in order to decrease the impedance Z1' of the stator route to be lower than the impedance Z1 of the stator route of the electric drive unit 1 of the related art by causing the inverter circuit unit 22 and the stator core 7 to directly abut on each other across a wide area.

In the radial gap outer rotor type motor configured in this manner, a pair of the flange-like members 4b and 5b of the left and right sides and the circumferential-direction retaining member 3 of the motor housing 2 are rotated in synchronization with the rotor 9.

Figure 10B:
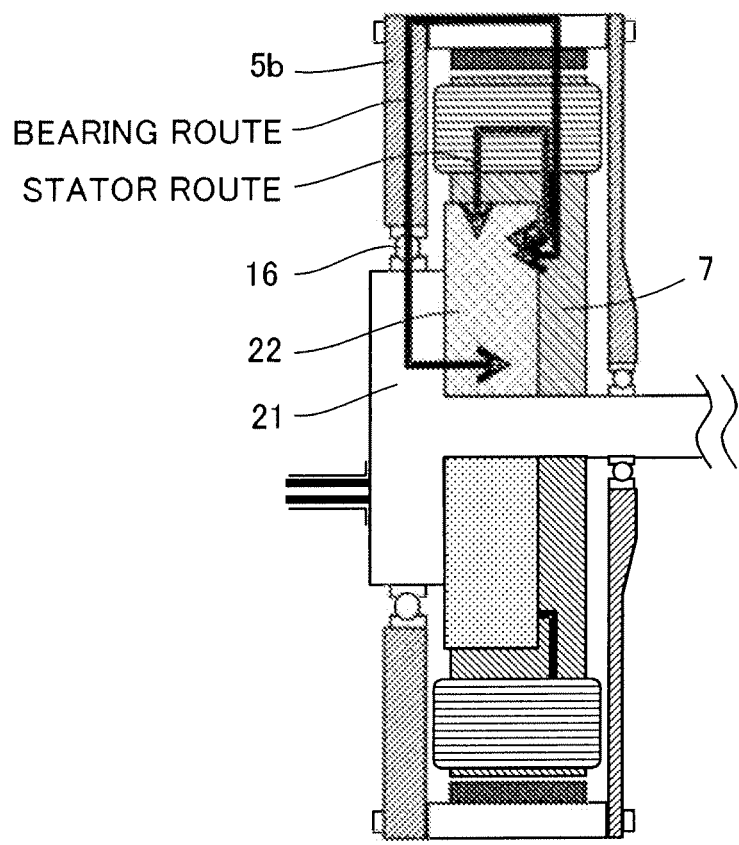
FIG. 10B is a schematic vertical cross-sectional view of the electric drive unit, obtained by delineating a pair of routes in FIG. 10A.

FIG. 10B is a schematic vertical cross-sectional view of the electric drive unit 1, obtained by delineating a pair of routes including the stator route and the bearing route in FIG. 10A. In the electric drive unit 1 according to the fifth embodiment, by causing the inverter circuit unit 22 and the stator core 7 to directly abut on each other across a wide area, the impedance Z1' of the stator route is lower than the impedance Z1 of the stator route of the electric drive unit 1 of the related art. In addition, the impedance Z1' of the bearing route is higher than the impedance Z2 of the bearing route of the electric drive unit 1 of the related art. As a result, also in the electric drive unit 1 according to the fifth embodiment, a frequency characteristic curve for the impedance of the stator route and a frequency characteristic curve for the impedance of the bearing route are similar to those of FIGS. 2 and 7. That is, a relationship Z1'<Z2' is established between the impedance Z1' of the stator route and the impedance Z2' of the bearing route across overall frequency bands. As a result, it is possible to alleviate external electromagnetic noise emission and increase a lifespan of the second bearing 16.

In this manner, according to the fifth embodiment, the motor housing 2 includes the first and second flange-like members 4b and 5b and the circumferential-direction retaining member 3 that stores the stator 6 and the rotor 9 the outer circumferences of which are in a galvanic isolation state. The first flange-like member 4b has the first bearing 15 in the inner circumference side and extends to the outer side in a radial direction of the shaft 10. The second flange-like member 5b has a second bearing 16 in an inner circumference side and extends to an outer side in a radial direction of the shaft 10. The inverter casing 21 includes the disk-like member 61 and the concentric member 62 provided in an axial center position of the disk-like member 61, as a support member. The stator 6 is fixed to the outer circumferential wall of the concentric member 62, and the rotor 9 is fixed to the inner circumferential wall of the circumferential-direction retaining member 3. In addition, the first flange-like member 4b is rotationally supported by the support members 61 and 62 using the first bearing 15, and the second flange-like member 5b is rotationally supported by the support members 61 and 62 using the second bearing 16. The inverter circuit unit 22 (inverter) is directly fixed to the stator 6. According to the fifth embodiment, since the inverter casing 21 is directly connected to the stator 6, the impedance between the inverter casing 21 and the stator 6 is lowered. Therefore, the impedance of the stator route corresponding to an electric current path that does not pass through the shaft 10 and the second bearing 16 is lower than the impedance of the bearing route corresponding to an electric current path passing through the shaft 10 and the second bearing 16 across overall frequency bands. As a result, the high-frequency electric current component flowing through the shaft 10 is reduced, and accordingly, it is possible to alleviate emissive electromagnetic noise.

While the present invention has been described in detail with reference to the accompanying drawings hereinbefore, it is not intended to limit the invention to such specific configurations. Various modifications, changes, and the like may be possible without departing from the spirit and scope of the invention and equivalents thereof as disclosed in claims.

In the electric drive unit according to each of the aforementioned embodiments, out of a plurality of paths where the high-frequency electric current generated from the inverter 22 flows, the length of the path (stator route) passing through the stator 6 is shorter than the length of the path (bearing route) passing through the shaft 10. However, in a case where the length of the stator route is equal to the length of the bearing route, the aforementioned effects can also be obtained. Therefore, it is preferable that the length of the path (stator route) passing through the stator 6 be equal to or smaller than the length of the path (bearing route) passing through the shaft 10.

Although a plurality of trenches 52 and 53 are provided in a pair of flange-like members 4b and 5b in the third embodiment, a plurality of trenches 52 and 53 may also be provided in a pair of flange-like members 4b and 5b in the fourth embodiment. In addition, although the axial cross-sections of a pair of flange-like members 4b and 5b have a step-like shape in the fourth embodiment, the axial cross-sections of a pair of flange-like members 4b and 5b may also have a step-like shape in the third embodiment.

This application claims priority based on JP2010-166851, filed with the Japan Patent Office on Jul. 26, 2010, the entire contents of which are incorporated into this specification by reference.

The invention claimed is:

1. An electric drive unit comprising:
   an inverter;
   a stator that receives an AC current from the inverter and forms a magnetic field;
   a rotor rotated by the magnetic field formed by the stator;
   a shaft that protrudes into both sides in an axial direction of the rotor and moves in synchronization with the rotor;
   an inverter casing that stores the inverter in a galvanic isolation state; and
   a motor housing that stores the stator and the rotor, rotatably supports one end of the shaft via a first bearing, and rotatably supports the other end of the shaft via a second bearing,
   wherein the inverter and the inverter casing are arranged in an inner side from a pair of bearings including the first and second bearings,
   wherein there are a plurality of paths where a high-frequency electric current generated from the inverter flows, the plurality of paths including a first path passing from the inverter through the stator and returning to the inverter, and a second path passing from the inverter through the shaft and returning to the inverter, and
   wherein a length of the first path is equal to or smaller than a length of the second path.

2. The electric drive unit according to claim 1, wherein the motor housing and the inverter casing are fixed by interposing a conductive member.

3. The electric drive unit according to claim 1, wherein the motor housing and the inverter casing abut on each other on at least one surface.

4. The electric drive unit according to claim 1, wherein the motor housing comprises:
   a circular cylindrical circumferential-direction retaining member that stores the stator and the rotor,
   a first flange-like member that has a first bearing in an inner circumferential side and extends to an outer side in a radial direction of the shaft, and
   a second flange-like member that has a second bearing in an inner circumferential side and extends to an outer side in a radial direction of the shaft,
   wherein a circular cylindrical circumferential-direction retaining member having a diameter smaller than that of the circumferential-direction retaining member is arranged as a circumferential-direction retaining member of the inverter casing in an inner circumferential side of the circumferential-direction retaining member of the motor housing,
   wherein both ends of the circumferential-direction retaining member of the inverter casing in an axial direction of the shaft are fixed to the first and second flange-like members, and
   wherein the inverter is stored in a space between the circumferential-direction retaining member of the inverter casing and the circumferential-direction retaining member of the motor housing.

5. The electric drive unit according to claim 4, wherein the first and second flange-like members have a plurality of trenches.

6. The electric drive unit according to claim 4, wherein axial cross-sections of the first and second flange-like members have a step-like shape.

7. The electric drive unit according to claim 1, wherein the motor housing comprises:
   a circumferential-direction retaining member that stores the stator and the rotor,
   a first flange-like member that has the first bearing in an inner circumferential side and extends to an outer side in a radial direction of the shaft, and
   a second flange-like member that has the second bearing in an inner circumferential side and extends to an outer side in a radial direction of the shaft,
   wherein the inverter is generally formed in a ring shape and is fixed to an inner circumferential wall of the circumferential-direction retaining member of the motor housing, and
   wherein the stator is fixed to an inner circumferential wall of the inverter formed in a ring shape.

8. The electric drive unit according to claim 1, wherein the motor housing comprises:
   a circumferential-direction retaining member that stores the stator and the rotor,
   a first flange-like member that has a first bearing in an inner circumferential side and extends to an outer side in a radial direction of the shaft, and
   a second flange-like member that has a second bearing in an inner circumferential side and extends to an outer side in a radial direction of the shaft,
   wherein the inverter casing includes a disk-like member and a concentric member provided in an axial center position of the disk-like member, as a support member,
   wherein the stator is fixed to an outer circumferential wall of the concentric member, the rotor is fixed to an inner circumferential wall of the circumferential-direction retaining member,
   wherein the first flange-like member is rotationally supported by the support member via the first bearing, the second flange-like member is rotationally supported by the support member via the second bearing, and
   wherein the inverter is directly fixed to the stator.

* * * * *